United States Patent [19]

Kawaguchi et al.

[11] 4,311,060
[45] Jan. 19, 1982

[54] PARKING BRAKE OPERATING DEVICE

[75] Inventors: Hiroshi Kawaguchi, Mishimashi; Masaki Sanayama, Susonoshi, both of Japan

[73] Assignee: Toyota Jidosha Kabushiki Kaisha, Aichi, Japan

[21] Appl. No.: 118,102

[22] Filed: Feb. 4, 1980

[30] Foreign Application Priority Data

Feb. 13, 1979 [JP] Japan .............. 54-015913[U]

[51] Int. Cl.³ ............ F16H 27/02; B60K 41/24; A63B 61/04
[52] U.S. Cl. .................... 74/142; 74/538; 192/12 B; 254/369; 254/376
[58] Field of Search .............. 74/141.5, 142, 538; 254/218, 352, 353, 354, 357, 369, 376; 192/12 B

[56] References Cited

U.S. PATENT DOCUMENTS

| 517,405 | 3/1894 | Gerbig | 192/12 B |
|---|---|---|---|
| 606,760 | 7/1898 | Heisey | 254/218 |
| 1,099,319 | 6/1914 | Snedeker | 254/218 |
| 1,287,050 | 12/1918 | Kranz | 254/218 |
| 1,306,803 | 6/1919 | Crewson | 254/357 |
| 1,861,131 | 5/1932 | Neate | 192/12 B |
| 2,026,350 | 12/1935 | Looschen | 254/352 |
| 2,878,910 | 3/1959 | Gunkel | 192/12 B |
| 3,100,031 | 8/1963 | Lock | 254/352 |
| 3,724,816 | 4/1973 | Cain et al. | 254/369 |
| 4,138,905 | 2/1979 | Konishi | 74/501 R |

FOREIGN PATENT DOCUMENTS

| 150769 | 2/1932 | Switzerland | 74/142 |
|---|---|---|---|
| 1211544 | 11/1970 | United Kingdom | 74/142 |

*Primary Examiner*—Lawrence J. Staab
*Attorney, Agent, or Firm*—Browdy and Neimark

[57] ABSTRACT

An automotive parking brake operating device in which, when the brake handle is pulled up a locking mechanism which moves with the brake handle rotates a rotating member to wind the brake cable around the winding portion of the rotating member, and when the brake handle is lowered the rotating member is kept locked by another locking mechanism. By repeating the above operation of the brake handle, the rotating member is intermittently rotated until necessary length of the brake cable is wound up to effect firm locking of the parking brake. In disengaging the brake, the cable is loosened by turning the rotating member in the reverse direction by combined operation of the locking mechanism and the brake handle.

5 Claims, 5 Drawing Figures

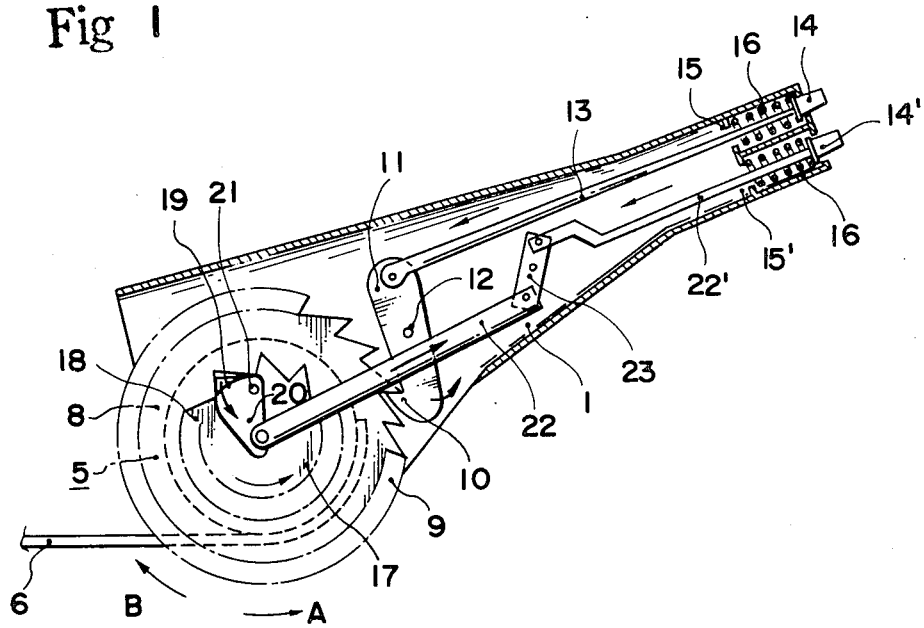
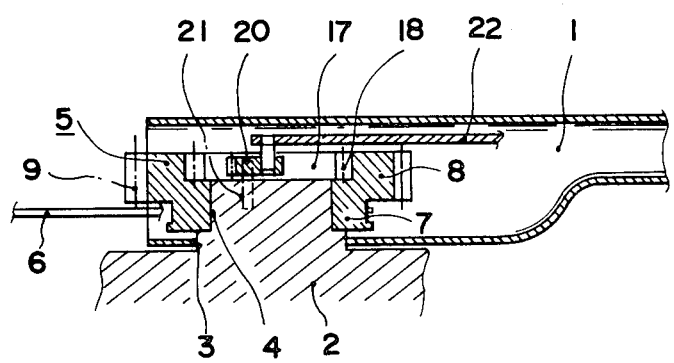
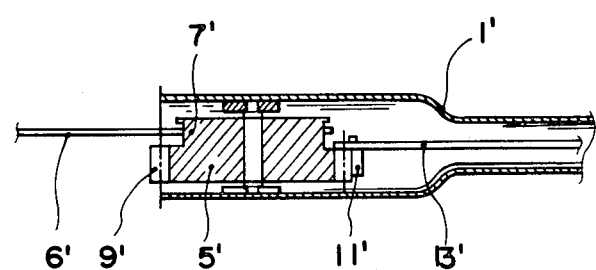

PARKING BRAKE OPERATING DEVICE

BACKGROUND OF THE INVENTION

1. Field of the Invention

This invention relates to a parking brake operating device for automotive brakes. More particularly, it relates to an automotive parking brake operating device which is used for those brakes of cargo trucks whose brake cable must be pulled over a great length to assure sufficient braking force. It also relates to a parking brake operating device in which a rotating member having a brake cable winding portion cooperates with a plurality of locking mechanisms, and in which, when the brake handle is operated, an operating rod and a cam of at least one of the locking mechanisms move with the brake handle, whereby the brake handle is repeatedly operated to wind the necessary length of the brake cable so as to firmly lock the parking brake.

2. Description of the Prior Art

Generally, many conventional cargo trucks employ a center brake type parking brake. There is a growing tendency in recent years for incorporation of the parking brake function into a leading trailing brake (referred to as "LT brake" hereinafter) in order to reduce the cost of the parking brake and to cope with the thermal load caused when the dynamic parking is effected.

However, in the parking brake incorporated into the LT brake, the length of the brake cable that must be pulled to ensure sufficient braking force is long compared to the conventional center brake type, so that it is extremely disadvantageous to apply a conventional single-stroke type parking brake operating device to the LT brake. This is because the single-stroke type operating device cannot pull the required length of cable with one stroke and, to meet this requirement, the stroke of the brake handle necessarily becomes long and it would therefore be difficult to operate the device.

SUMMARY OF THE INVENTION

An object of this invention is to provide a parking brake operating device in which the brake handle is operated repeatedly to wind up the required length of the brake cable so as to overcome the conventional drawbacks experienced in pulling the brake cable over a great length, as in the parking brakes incorporated in the LT brake, and thereby enable easy and smooth operation of these parking brakes.

BRIEF DESCRIPTION OF THE DRAWINGS

The accompanying drawings illustrate preferred embodiments of this invention.

FIG. 1 is an overall view of one embodiment;

FIG. 2 is a lateral cross-sectional view of the embodiment as illustrated in FIG. 1;

FIG. 4 is a lateral cross-sectional view of the embodiment as illustrated in FIG. 3.

DETAILED DESCRIPTION OF THE PREFERRED EMBODIMENTS

Figure 3:
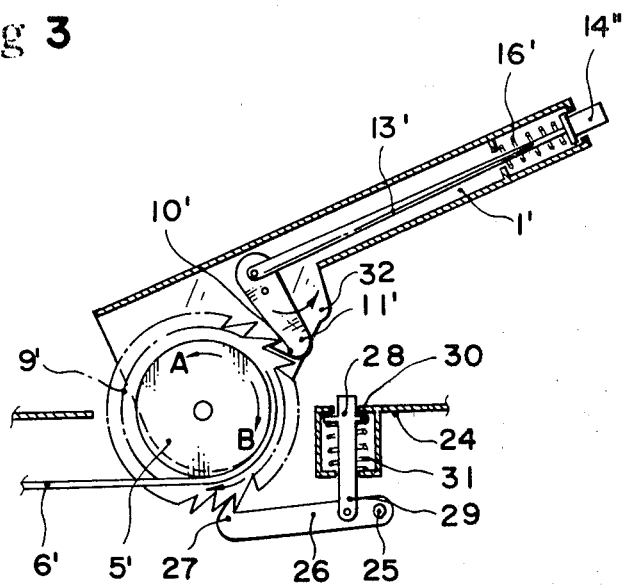
FIG. 3 is an overall view of another embodiment of this invention.

FIGS. 1 and 2 shows a lever type parking brake operating device which embodies the present invention. The lever type brake handle 1 is rotatably mounted on a rotary seat 3 of a stationary member 2 installed on the floor near the side of the driver's seat. The brake handle 1 has a means for preventing itself from coming off the rotary seat 3.

The stationary member 2 has another rotary seat 4 in the brake handle 1 on which a rotary plate 5 is rotatably mounted, with a means provided for preventing the rotary plate from coming off the seat.

As shown in FIG. 2, the rotary plate 5 has a step to provide small and larger diameter portions. The smaller diameter portion formed on the side of the stationary member 2 serves as a cable winding portion 7 which has a brake cable 6 secured around the circumferential surface thereof. The large diameter portion formed on the side opposite to the stationary member 2 has teeth 9 formed around the circumferential surface thereof with which a pawl 10 at the front end of a cam 11 is engaged, thereby forming a ratchet type lock mechanism. The cam 11 is pivoted on a pin 12 which in turn is secured to the inner surface of the brake handle 1.

The rear end of the cam 11 is pivotally pinned to one end of an operating rod 13 the other end of which has a push-button 14 projecting from the front end of the brake handle 1. Interposed between the push-button 14 and a flange 15 formed inside the brake handle 1 is a spring 16 which urges the push-button 14 to project and the pawl 10 of the cam 11 to press against the rotary plate 5.

The rotary plate 5 has a circular groove 17 which is cut into the end surface of the larger diameter portion and which is formed with moderately sloping teeth 18 along the inner circumferential surface. A cam 20 whose pawl 19 engages with the teeth 18 is pivotally mounted by a pin 21 to the end surface of the stationary member 2 in the circular groove 17, and the rear end of the cam 20 is pivotally connected by a pin to an operating rod 22. The operating rod 22, by way of a reverse link 23 pivoted to the inner wall of the brake handle 1, extends toward the front end of the brake handle 1 and has a push-button 14' mounted on its tip at the front end of the handle with a spring 16 interposed between the push-button 14' and the flange 15' as in the case with the operating rod 13.

The relations between the outer end and inner teeth 9, 18 of the rotary plate 5 and the associated cam 11, 20 are determined such that under normal condition, i.e., when the pawls 10, 19 are urged against the teeth 9, 18, they both prevent the rotation of the rotary plate 5 in the direction B and allow it to rotate in the direction A.

The brake cable 6 whose one end is fixed to the cable winding portion 7 is connected with the parking brake mechanism (not shown) fitted to the LT brake for the rear wheels.

In effecting the parking brake when the vehicle is parked, the brake handle 1 is pulled up without depressing the push-buttons 14, 14'. This causes the brake handle 1 to rotate upward about the rotary seat 3 and at the same time the pawl 10 of the cam 11 which rotates with the brake handle engages with the teeth 9 and thereby rotates the rotary plate 5 in the direction A. At this time, the cam 20 allows the inner teeth 18 to rotate in the direction A. This in turn causes the cam 20 to rotate in the direction indicated by the arrow thereby compressing the spring 16.

While the brake handle 1 is being pulled up, the rotary plate 5 rotates through the same angle as that of the brake handle 1. When the brake handle 1 reaches the uppermost position and the rotary plate 5 stops rotating, the inner teeth 18 becomes locked by the pawl 19 of the cam 20, so that if the brake handle 1 is lowered, the rotary plate 5 is prevented by the pawl 19 from rotating in the direction B and therefore remains in the same position. Thus, when the brake handle is lowered to move the cam 11 downward relative to the stationary rotary plate 5, the cam 11 mounted on the brake handle moves along the outer teeth 9 compressing the spring 16. Thus, the downward movement of the cam 11 does not impart rotary force to the plate 5.

Then, if the brake handle 1 is pulled upward again, the cam 11 forces the rotary plate 5 to rotate further in the same direction.

Thus, by repeating the pulling-up operation of the brake handle 1 to rotate the rotary plate 5 intermittently in the direction A, a required length of the brake cable 6 is wound on the cable winding portion to effect firm locking of the LT brake for the rear wheels. After the pulling-up operation has been completed, the brake handle 1 assumes the pulled-up position.

In releasing the parking brake as when starting the automobile, the pulled-up brake handle 1 is lowered with the push-button 14' at the front end of the handle 1 depressed. The operating rod 22 is then pulled in the direction indicated by the arrow by means of the operating rod 22' and the reverse link 23 thereby releasing the cam 20 from the inner teeth 18 of the rotary plate 5. On the other hand, since the cam 11 is lowered together with the brake handle 1, the rotary plate 5 is rotated in the direction B by the restoring action, transmitted through the cable 6, of the spring (not shown) incorporated in the LT brake, with the pawl 10 of the cam 11 engaged with the teeth 9. This alleviates the tension of the brake cable 6 and releases the brake.

However, the brake cable 6 cannot be unwound completely by a single stroke of lowering operation of the brake handle 1. Now, the push-button 14 is depressed this time instead of the push-button 14'. This causes the pawl 10 of the cam 11 to come off the teeth 9 so that the brake handle 1 can be pulled up again without rotating the rotary plate 5 in the direction A. After the brake handle 1 has been pulled up, the push-button 14' is depressed and the brake handle is again lowered. By repeating this operation the rotary plate 5 is rotated in the direction B until the brake is disengaged.

To confirm that the brake is completely disengaged, appropriate detecting means may be provided, such as those that light a lamp when the brake cable 6 on the rotary plate 5 is completely unwound.

The parking brake can be disengaged by a single operation, i.e., by depressing both the push-buttons 14, 14' at one time. Depressing both the push-buttons 14,14' at one time releases the pawls 10, 19 of the cams 11, 20 from the outer and inner teeth 9, 18 simultaneously and allows the brake cable to be unwound by the restoring force of the spring incorporated in the brake.

FIGS. 3 and 4 show another embodiment of this invention. A pawl 10' at the end of the cam 11' pivoted to the inner surface of the brake handle 1' is urged by the spring 16' through the operating rod 13' and the push-button 14" to engage with the teeth 9' formed on the outer circumferential surface of the rotary plate 5'. Due to this construction, when the brake handle 1' is pulled up, the rotary plate 5' is rotated in the direction A by the cam 11', as in the preceding embodiment.

Also engaged with the teeth 9' of the rotary plate 5' is a pawl 27 of another cam 26 supported on the pin 25 below the floor 24. When the rotary plate 5' is rotated in the direction A during the process described above, the cam 26 is allowed to oscillate by the spring 31 mounted on the connecting rod 28 below the flange 30 formed on the free end portion 29 of the rod 28 so that no obstructing force is applied to the rotary plate 5' by the pawl 27.

When the brake handle 1' is lowered following the pulling-up operation, the rotary plate 5' is locked by the cam 26 and the cam 11' oscillates compressing the spring 16' as it is lowered together with the brake handle 1'.

Thus, repeating the pulling-up and lowering operation of the brake handle 1' rotates the rotary plate 5' intermittently in the direction A until a necessary length of brake cable 6' is wound to effect a firm locking of the brake.

To release the parking brake, the push-button 14" at the front end of the brake handle 1' is depressed against the force of the spring 16'. As a result, the operating rod 13' is pushed and the cam 11' rotates in the direction indicated by the arrow, releasing the pawl 10' at the end of the cam 11' from the teeth 9' on the outer circumferential surface of the rotary plate 5', so that the brake handle 1' becomes free from the rotary plate 5'. At this time, the rotary plate 5' is prevented from rotating in the direction B by the cam 26 engaging with the lower portion of the rotary plate 5'.

If, with the push-button 14" depressed, the brake handle 1' is lowered further from the normal position (or a virtually horizontal position when the brake is released), a depresser 32 projecting from the lower surface of the base portion of the brake handle 1' abuts against the upper end 29 of the connecting rod 28 and depresses it against the force of the spring 31. This causes the cam 26 to turn in the direction indicated by the arrow, releasing the pawl 27 at the end of the cam 26 from the teeth 9' of the rotary plate 5', so that the rotary plate 5' becomes free and is rotated in the direction B by the brake cable 6 which is pulled by the restoring spring incorporated in the brake mechanism. Then, the parking brake is completely disengaged.

Figure 5:
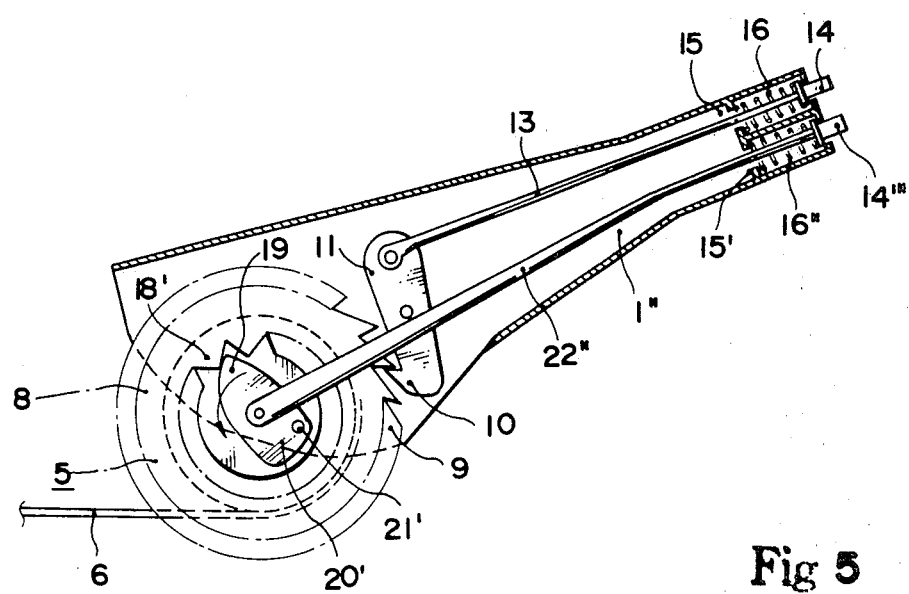
FIG. 5 is an overall view of still another embodiment of this invention.

A third embodiment shown in FIG. 5 simplifies the construction of the cam and the operating rod of FIGS. 1 and 2. The main differences between these embodiments are as follows. Although the cam 20' has a pawl 19' at its end engaging with the teeth 18' as in the first embodiment shown in FIGS. 1 and 2, the pin 21' supporting the cam 20' is located below the connecting point between the cam 20' and the operating rod 22" and the operating rod 22" extends almost linearly toward the front end of the brake handle 1' without such interpositions as a link. The operating rod 22" has a push-button 14"' on its tip at the front end of the brake handle 1' and also a spring 16" disposed near the tip.

With this construction, depressing the push-button 14"' causes the cam 20' to rotate in the direction indicated by the arrow thus releasing the pawl 19' from the teeth 18'. While the operating procedure and the locking mechanism are entirely the same as those of the first embodiment illustrated in FIGS. 1 and 2, the third embodiment is characterized by a simple construction and therefore a reduced cost.

It should be noted, however, that the present invention is not limited to the preceding embodiments and that other designs are possible. For example, in FIGS. 1 and 2, the inner cam 20 may be adapted to engage with the outer teeth 9 of the rotary plate 5; or in FIGS. 3 and 4, the rotary plate 5' may be formed with inner teeth with which the cam 11' may be made to engage. It is also apparent that this invention can be applied not only to the LT brake but also other brake mechanisms such as a pull-type handle brake.

As can be seen in the foregoing, with the parking brake operating device of this invention which employs the rotary plate as the brake cable winder rotated by repeating the operation of the brake handle with the aid of the locking mechanisms, it is possible to firmly lock the parking brake incorporated in the LT brake in which the brake cable must be pulled a great length. Thus, the parking brake operating device of this invention enables the application of the parking brake to the LT brake for such vehicles as small trucks.

Furthermore, since the pawls of cams are resiliently urged to engage with the teeth formed along the circumferential surface of the rotary plate and one of the cams is mounted on the brake handle so as to be movable with it, the brake can very easily be engaged by repeating the operation of the brake handle and disengaged by pressing the operating rods connected with the cams. Thus, this device has a very good operability.

Moreover, if the brake cable elongates with the lapse of time, the cable can be tightened up by turning the rotary plate while with the conventional device the brake becomes loose.

Furthermore, since pivot connecting cam and operating rod is rocated in the centre of rotary plate when the corresponding push-button is pushed as in embodiments FIGS. 1 and 5, said push-button is not sunk or projected from its set position by the moving of said operating rod.

What is claimed is:

1. A parking brake operating device comprising: a brake handle; a rotating member having a brake cable winding portion and also having teeth which are formed on both outer and inner circumferential surfaces of said rotating member, a pair of cams releasably engaged with said teeth respectively in such a manner that said rotating member can rotate in a single direction only, reverse rotation being prevented by either one of said cams; respective operating rods having springs, said cams being connected to said respective operating rods having springs, said cams being adapted to be engaged with or released from said teeth of said rotating member, said cams and said operating rods forming a pair of locking mechanisms for said rotating member, at least one of said cams being mounted to the brake handle so that they move together; one of said cams in releasible engagement with said inner teeth being mounted on a pivot, and the end of the operating rod associated with that one of said cams being connected thereto at a point substantially coincident with the axis of rotation of said rotating member; whereby the brake handle is repeatedly operated to effect the braking.

2. A parking brake operating device comprising: a brake handle; a rotating member having a brake cable winding portion and also having teeth which are formed on both outer and inner circumferential surfaces of said rotating member, a pair of cams releasably engaged with said teeth respectively in such a manner that said rotating member can rotate in a single direction only, reverse rotation being prevented by either of said cams; respective operating rods having springs, said cams being connected to said respective operating rods having springs, said cams being adapted to be engaged with or released from said teeth of said rotating member, said cams and said operating rods forming a pair of locking mechanisms for said rotating member, and at least one of said cams being mounted to the brake handle so that they move together; wherein one of said operating rods has a reverse link incorporated therein, the end of this said one operating rod being pivoted to that one of said cams releasably engaged with the inner teeth, and that one of said cams being mounted on a fulcrum located between the inner circumferential teeth and the point of pivoted connection of that one of said cams to its respective operating rod; whereby the brake handle is repeatedly operated to effect the braking.

3. A parking brake operating device comprising: a brake handle; a rotating member having a brake cable winding portion and also having teeth which are formed on both outer and inner circumferential surfaces of said rotating member, a pair of cams releasably engaged with said teeth respectively in such a manner that said rotating member can rotate in a single direction only, reverse rotation being prevented by either of said cams; respective operating rods having springs, said cams being connected to said respective operating rods having springs, said cams being adapted to be engaged with or released from said teeth of said rotating member, said cams and said operating rods forming a pair of locking mechanisms for said rotating member, and at least one of said cams being mounted to the brake handle so that they move together; wherein that one of said cams for the inner teeth being mounted on a fulcrum, the point of connection of that one of said cams with its associated operating rod being located between said fulcrum and a pawl on the end of that one of said cams engaging the inner teeth; whereby the brake handle is repeatedly operated to effect the braking.

4. A parking brake operating device comprising a brake handle; a rotating member having a brake cable winding portion and also having teeth which are formed on both outer and inner circumferential surfaces of said rotating member, a pair of cams releasably engaged with said teeth respectively in such a manner that said rotating member can rotate in a single direction only, reverse rotation being prevented by either one of said cams; respective two operating rods having springs, said cams being connected to said respective operating rods having springs, said cams being adapted to be engaged with or released from said teeth of said rotating member, said cams and said two operating rods forming a pair of locking mechanisms for said rotating member, both of said cams and both of said rods being mounted inside of said brake handle, whereby said handle can be easily manipulated by a single hand of a user, and at least one of said cams being mounted to the brake handle so that they move together; whereby the brake handle is repeatedly operated to effect the braking.

5. A parking brake operating device as set forth in claim 4, wherein the teeth and the cams form a ratchet mechanism.

* * * * *